United States Patent [19]

Hamilton et al.

[11] 4,200,615

[45] Apr. 29, 1980

[54] ALL-PYROTECHNIC INFLATOR

[75] Inventors: Brian K. Hamilton; Eugene F. Garner; Terry R. Harrell, all of Saugus, Calif.

[73] Assignee: Allied Chemical Corporation, Morris Township, Morris County, N.J.

[21] Appl. No.: 791,745

[22] Filed: Apr. 28, 1977

Related U.S. Application Data

[63] Continuation of Ser. No. 671,658, Mar. 29, 1976, abandoned.

[51] Int. Cl.² .......................... B01J 7/00; B60R 21/02
[52] U.S. Cl. ................................. 422/166; 280/736; 280/740; 280/741; 422/113; 422/126; 422/167
[58] Field of Search .................. 23/281; 280/736, 740, 280/741; 102/39, 70, 100; 9/321; 422/113, 123, 125, 126, 165, 166, 167, 164

[56] References Cited

U.S. PATENT DOCUMENTS

| | | | |
|---|---|---|---|
| 3,256,819 | 6/1966 | Leeper | 102/99 UX |
| 3,618,521 | 11/1971 | Montesi | 102/39 R |
| 3,618,980 | 11/1971 | Leising et al. | 422/165 X |
| 3,618,981 | 11/1971 | Leising et al. | 422/165 X |
| 3,715,131 | 2/1973 | Hurley et al. | 422/166 X |
| 3,721,456 | 3/1973 | McDonald | 102/39 UX |
| 3,733,180 | 5/1973 | Heineck et al. | 422/167 |
| 3,880,447 | 4/1975 | Thorn et al. | 23/281 R |
| 3,897,285 | 7/1975 | Hamilton et al. | 280/741 X |
| 3,901,747 | 8/1975 | Garner | 280/741 X |
| 4,012,211 | 3/1977 | Goetz | 280/741 X |
| 4,131,300 | 12/1978 | Radke et al. | 280/741 X |

*Primary Examiner*—Barry S. Richman
*Attorney, Agent, or Firm*—Roger H. Criss; Ernest D. Buff

[57] ABSTRACT

An all-pyrotechnic inflator, for generating an inflating gas, includes: an elongated enclosure means, a linear ignitor, and a pyrotechnic material. The elongated enclosure means has a longitudinal axis and an outlet means for passage of the gas. The linear ignitor is arranged within the enclosure means and extends along at least part of the longitudinal axis of the enclosure means. The pyrotechnic material is disposed within the enclosure means and extends along at least part of the longitudinal extent of the enclosure means for combustion and generation of gas upon ignition by the linear ignitor. The enclosure means further includes an inner wall, an outer wall, a nozzle means, and a means for maintaining substantially constant pressure during generation of the gas. The pyrotechnic material is the sole source of the inflating gas.

10 Claims, 3 Drawing Figures

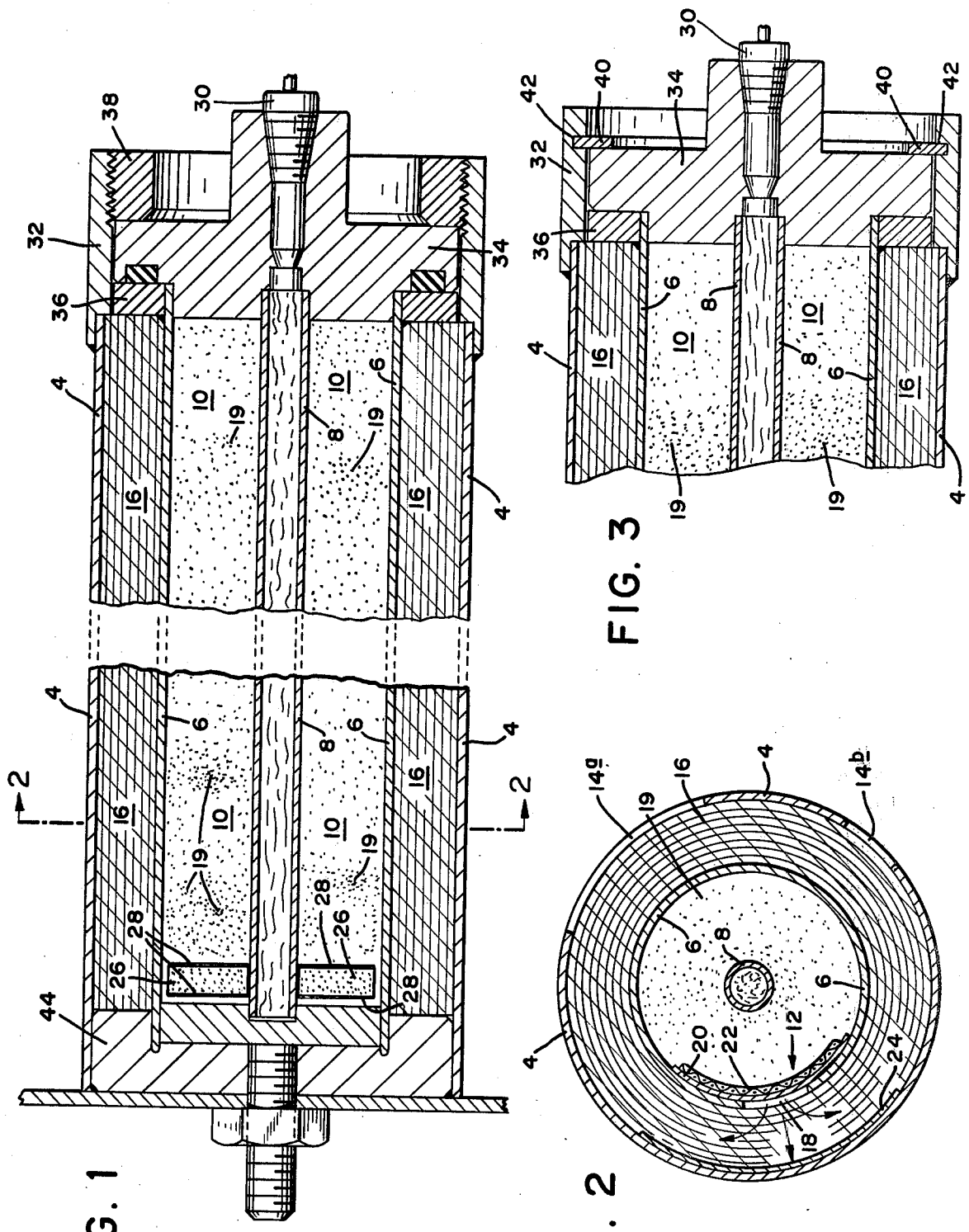

ALL-PYROTECHNIC INFLATOR

This is a continuation of application Ser. No. 671,658, filed Mar. 29, 1976 now abandoned.

BACKGROUND OF THE INVENTION

The present invention relates to an all-pyrotechnic inflator apparatus for generating an inflating gas to inflate a device such as an air bag for a vehicle safety restraint system, or a life raft, or other inflatable structure. Most apparatus for generating an inflating gas depend upon a stored fluid, either compressed gas or liquefied gas, or a mixture of a stored gas and a gas generated by burning a pyrotechnic material. An apparatus, different in design from the present invention, in which a pyrotechnic material is burned to generate an inflating gas without the use of a stored gas is disclosed in U.S. Pat. No. 3,618,980 and U.S. Pat. No. 3,618,981 to Leising; U.S. Pat. No. 3,733,180 to Hernect et al.; and in U.S. patent application Ser. No. 316,947, filed Dec. 20, 1972 which is a continuation of U.S. patent application Ser. No. 110,845, filed Jan. 29, 1971, both entitled "Gas Generator", both filed in the name of John J. Sack and Thomas E Lohr, both having a common assignee with the present invention, and both now abandoned.

SUMMARY OF THE INVENTION

The present invention is an all-pyrotechnic inflator apparatus for generating an inflating gas. The inflator includes an elongated enclosure means, a linear ignitor, and a pyrotechnic material. The elongated enclosure means has a longitudinal axis and an outlet means for passage of the gas. The linear ignitor is arranged within the enclosure means and extends along at least part of the longitudinal axis of the enclosure means. The pyrotechnic material is disposed within the enclosure means and extends along at least part of the longitudinal extent of the enclosure means for combustion and generation of gas upon ignition by the linear ignitor. The pyrotechnic material is the sole source of the inflating gas.

The enclosure means further includes an inner wall and an outer wall, each having a longitudinal extent. The outlet means includes a plurality of outlet ports along at least part of the longitudinal extent of the outer wall. A nozzle means is arranged in the inner wall for passage of the gas to the outer wall of the enclosure means. The nozzle means includes a plurality of apertures along at least part of the longitudinal extent of the inner wall. The nozzle means further includes a means for maintaining substantially constant pressure during generation of the gas. The substantially constant pressure means includes a plurality of burst plates. One burst plate is arranged adjacent to each aperture in the inner enclosure. Each burst plate has an area larger than the area of the adjacent aperture. Each burst plate is disposed inside of the inner enclosure and covers the adjacent aperture prior to ignition of the pyrotechnic material. The substantially constant pressure means further includes a plurality of screen means, one screen means for each aperture in the enclosure. The screen means are arranged on the interior side of the burst plates.

Preferably, the inflator apparatus further includes a filter means arranged between the outer wall and inner wall along at least part of the longitudinal extent of the wall. In a preferred embodiment, the outlet ports are arranged along two lines on the outer wall. The linear ignitor in the preferred embodiment extends through substantially the entire length of the enclosure means. The pyrotechnic material is disposed substantially around the linear ignitor. The pyrotechnic material may preferably have a grain geometry means which provides a substantially constant surface area exposed to burning during combustion. The grain geometry means provides for a quick initial generation of gas, substantially constant generation of gas over a time interval, and rapid termination of gas generation after the time interval for generation has ended. The inflator may also include a thrust neutralizing means on an inner side of the outer wall opposite from the outlet ports on the outer wall for neutralizing thrust resulting from generation of gas.

DESCRIPTION OF THE DRAWINGS

FIG. 1 is a cross-sectional view of the inflator apparatus of the present invention.

FIG. 2 is a cross-sectional view of FIG. 1 along the lines 2—2 in FIG. 1.

FIG. 3 is a cross-sectional view of a portion of an alternate embodiment to FIG. 1.

DETAILED DESCRIPTION

The inflator of the present invention generates a gas which may be used, for example, for inflating a safety bag, sometimes known as an air bag, in a vehicle to restrain an occupant of the vehicle, either driver or passenger, under emergency conditions, such as collision. The inflator may also be used with other inflatible devices, such as a life raft. The inflator is termed an "all-pyrotechnic" inflator because the gas generated upon combustion is derived solely from combustion of a pyrotechnic composition in the inflator. The inflator does not use a stored gas, nor a vessel for containing a stored gas under pressure. The gas generated by the inflator of the present invention is not the result of a mixture of a gas from a pyrotechnic composition and a stored gas.

Referring to FIGS. 1 and 2, the all-pyrotechnic inflator, designated generally by the numeral 2, includes: an elongated outer housing 4, an elongated inner enclosure 6, a linear ignitor 8, a pyrotechnic material 19, and a nozzle means 12 (FIG. 2). Referring to FIG. 2, the outer housing 4 has a plurality of outlet ports 14a and 14b along at least part of its length. The inner enclosure 6 is disposed longitudinally within the outer housing 4. The inner enclosure 6 has walls defining an interior combustion chamber 10 within the inner enclosure 6. The linear ignitor 8 is arranged within the inner enclosure 6 and extends along at least part of a longitudinal axis of the inner enclosure 6. The pyrotechnic material 19 is disposed in the combustion chamber 10 within the inner enclosure 6 and is disposed substantially around part or all of the linear ignitor 8 for combustion and generation of gas upon ignition by the ignitor 8. The nozzle means 12 is arranged in a wall of the inner enclosure 6 and extends along at least part of a longitudinal extent of the inner enclosure 6. The nozzle means maintains substantially constant pressure during generation of gas. In the preferred embodiment shown in FIGS. 1 and 2, the outer housing 4 and inner enclosure 6 have a circular cross-section and are closed tubes. Other embodiments may have a non-circular cross-section for the outer housing 4 and inner enclosure 6, such as a square, rectangular, or elliptical cross-section.

The arrangement of outlet ports 14 in the outer housing 4 depends upon the configuration of the device to be inflated by the gas generated within the inflator 2. For example, if the inflator 2 is intended for use with one safety bag, the outlet ports 14 in the outer housing 4 are preferably arranged along one longitudinal extent in the wall of the outer housing 4. Alternately, if the inflator 2 is intended for use with two safety bags, such as a torso bag to restrain movement of the torso of an occupant, and a knee bag to protect the knees of an occupant against bumping against the dashboard or other structure in the vehicle, the outlet ports 14 may be arranged in two rows along two longitudinal lines. One row of outlet ports 14a directs gas to the torso bag. The other row of outlet ports 14b directs gas to the knee bag. The outlet ports 14a for a torso bag may be larger in area than the outlet ports 14b for a knee bag because a torso bag is usually larger than a knee bag.

Preferably, the linear ignitor 8 extends through substantially the entire length of the inner enclosure 6. Preferably, the linear ignitor 8 is of a type which ignites along its entire length substantially instantaneously, that is, within about five milliseconds. For example, the linear ignitor may be a material manufactured by du Pont Corporation of Wilmington, Del. and sold under the trade name "Pyre Core." Optionally, other types of linear ignitors which have instantaneous ignition characteristics may also be used.

The pyrotechnic material may be selected from a wide range of available compositions. For example, the pyrotechnic material may be an azide composition, such as an approximately stoichiometric mixture of sodium azide and nickel oxide. Optionally, the pyrotechnic material may have a composition described in U.S. Pat. No. 3,897,285 to B. Hamilton entitled "Pyrotechnic Formulation with Free Oxygen Consumption" or in U.S. Pat. No. 3,901,747 to E. Garner entitled "Pyrotechnic Composition with Combined Binder-Coolant".

Preferably, a filter means 16 is arranged longitudinally between the outer housing 4 and the inner enclosure 6 along at least part of, and preferably substantially the entire length, of the outer housing 4 and inner enclosure 6. The filter means 16 provides the function of filtering undesired components from the gas after the gas has been generated by combustion of the pyrotechnic material and before the gas passes through the outlet ports 14 in the outer housing 4. For example, if the pyrotechnic material which has been selected generates a gas containing caustic substances, the filter means 16 may be of a type which will remove or neutralize such caustic substances.

Preferably, the pyrotechnic material is in the form of grains or pellets which have a geometry which provides a substantially constant surface area exposed to burning during combustion. Preferably, such geometry provides quick onset of gas generation, e.g. 4 milliseconds; substantially constant generation of gas over a short time interval, e.g. 50 milliseconds; and rapid termination of gas generation after the desired time interval for generation of gas has ended. Such a cycle of gas generation is desirable in order to provide quick inflation of the safety bag, maintenance of the safety bag in an inflated condition for the time interval during which the bag absorbs shock, such as that resulting from impact of the occupant on the bag, and rapid deflation of the bag so that the bag is no longer in the way of the occupant after collision.

Optionally, the pyrotechnic material may have a coating whih enhances ignition on selected surfaces of the propellant. For example, the pyrotechnic material may be pressed in the form of a plurality of cylinders 26 or wafers having a hole in the inner portion of each cylinder or wafer to contain the linear ignitor 8. Each cylinder or wafer may have such a coating on its planar surfaces 28, but not on its inner circumferential surface nor on its outer circumferential surface. The coating enhances combustion on the planar surfaces 28.

The nozzle means 12 in the wall of the inner enclosure 6 includes a plurality of apertures 18 along at least part of the length of the inner enclosure 6. Preferably, the nozzle means 12 further includes a plurality of burst plates 20, one burst plate 20 covering each aperture 18 in the inner enclosure 6. Each burst plate 20 has an area slightly larger than the area of its associated aperture 18. The burst plates 20 are arranged inside of the inner enclosure 6, in contact with a wall of the inner enclosure 6 and in overlapping relationship with their associated aperture 18 to cover and seal their associated aperture 18. Preferably, the nozzle means 12 further includes a plurality of screen means 22, such as a filtering screen, one screen means 22 for each aperture 18 in the inner enclosure 6. Each screen means 22 is arranged on the interior side of its associated burst plate 22. Thus, each burst plate 20 is arranged between its associated aperture 18 and its associated screen means 22. The burst plates 20 are designed to burst under a predetermined pressure depending upon the pyrotechnic material being used and other variables. Preferably, the burst plates 20 rupture under a pressure in the range between 1,000 pounds per square inch (psi) and 3,000 psi. Preferably, the burst plates 20 are made of metal shim stock or other similar material. Preferably, the apertures 18 and burst plates 20 are arranged so that some but not all of the burst plates 20 rupture at lower pressures in the range of 1,000–3,000 psi. Additional burst plates 20 rupture as the pressure increases in the range of 1,000–3,000 psi within the inner enclosure 6 during combustion of the pyrotechnic material and generation of gas, thereby maintaining substantially constant pressure of gas in the inner enclosure 6.

Initially, only a selected number of burst plates 20 will open, thereby contributing to an increase in pressure sufficient to inflate a bag. If the pressure within the inner enclosure 6 starts to climb too high, additional burst plates 20 would rupture, opening additional apertures 18 for release of gas, lowering the pressure or at least moderating the increase in pressure until the pressure of the gas within the inner enclosure 6 reaches a desired level. As a result, the nozzle means 12 compensates for use of the inflator 2 under a wide temperature range. The pressure of a gas generated by combustion of a pyrotechnic material varies directly with the temperature in the environment, that is, in the inner enclosure 6. If all other factors were the same, a pyrotechnic material burned in a cold climate, such as in a temperature of −20 degrees Fahrenheit, would generate less pressure than a pyrotechnic material burned in a warm climate, such as in a temperature of 95 degrees F. The nozzle means of the present invention would present fewer open apertures to escaping gas in a cold climate than in a warm climate, thus maintaining substantially constant pressure during generation of gas within a range such as 1000 psi to 3000 psi.

For example, in one embodiment of the present invention, the nozzle means 12 includes two different size apertures 18. The small apertures have an area of 0.4 square inches. The large apertures have an area of 0.5 square inches. Seven small apertures and seven large apertures are provided along a longitudinal axis of the inner enclosure 6, in alternating sequence. The burst plates 20 associated with the large apertures are larger than the burst plates associated with the small apertures.

Referring to FIG. 2, the inflator preferably includes a thrust neutralizing means. The thrust neutralizing means equalizes the thrust in various directions generated by the inflating gas. For example, if the pyrotechnic material were accidentally ignited during shipment while the inflator 2 was lying loose, instead of being anchored to a structure, such as an automobile, the thrust neutralizing means would prevent the inflating gas from providing a thrust analogous to that in a jet engine. The thrust neutralizing means would prevent the inflator from being thrown against an object with sufficient force to cause injury or damage. The thrust neutralizing means includes: a diffusion plate 24 on an interior wall of the outer housing 4 opposite the nozzle means 12.

The thrust neutralizing means further includes an arrangement whereby the outlet ports 14 in the outer housing 4 are arranged remote in circumference from the apertures 18 in the inner enclosure 6. For example, if two rows of outlet ports 14 are used in the outer housing 4, each row of outlet ports 14 is arranged approximately 120 degrees away from the apertures 18 of the nozzle means 12 in the inner enclosure 6. The two rows of outlet ports 14 are also arranged approximately 120 degrees away from one another. As a result, gas generated in the inner enclosure 6 and passing through the apertures 18 into the area between the outer housing 6 and the inner enclosure 4 is diffused by the diffusion plate 24 in various directions. A portion of the gas is diffused to flow clockwise to reach the outlet ports 14a for the torso bag. Another portion of the gas is diffused counterclockwise to reach the outlet ports 14b for the knee bag.

Referring to FIGS. 1 and 3, the inflator 2 includes a squib 30 mounted at one end to ignite the linear ignitor 8. The inflator 2 includes a closure means at each end. FIG. 1 shows a first embodiment of a closure means for the squib end. FIG. 3 shows a second embodiment of a closure means for the squib end. Referring to FIG. 1, the first embodiment of a closure means at the squib end includes: a collar 32, a first metal end plate 34, an inner ring 36 and an outer ring 38. The collar 32 is welded to the outer housing 4. The end plate 34 is hermetically sealed to the inner ring 36 which is affixed to the inner enclosure 6. The outer ring 38 is attached, preferably by screw threads to the inner wall of the collar 32 to retain the first end plate 34. The outer ring 38 may be crimped to the collar 32 to prevent disassembly. The squib 30 is mounted in the first end plate 34 and extends to the linear ignitor 8. In the second embodiment of FIG. 3, a snap ring 40 is used in place of the outer ring 38 in FIG. 1. The snap ring 40 fits into a groove 42 in the collar 32.

Referring to FIG. 1 and to the end of the inflator 2 opposite from the squib 30, the closure means includes a second metal end plate 44 welded or otherwise attached to outer housing 4.

We claim:

1. An all-pyrotechnic inflator for generating an inflating gas comprising:

an elongated enclosure means having an inner wall, an outer wall, an annular space between said walls, a longitudinal axis and an outlet means in said outer wall for passage of said gas;

a linear ignitor arranged within said enclosure means and extending along substantially the entire length of said longitudinal axis of said enclosure means;

a pyrotechnic material disposed within said enclosure means and extending substantially around said linear ignitor for combustion and generation of said gas upon ignition by said ignitor, said pyrotechnic material being the sole source of said inflating gas;

a nozzle means arranged in said inner wall for passage of said gas to said annular space, said gas passing through said outer wall and said outlet means, said nozzle means comprising a plurality of apertures along at least a part of the longitudinal extent of said inner wall; and means for maintaining substantially constant pressure during generation of said gas, said substantially constant pressure means comprising a plurality of burst plates, one burst plate adjacent to each aperture in said inner wall, each burst plate having an area larger than the area of said adjacent aperture, each burst plate disposed inside of said inner wall and covering said adjacent aperture prior to ignition of said pyrotechnic material, said burst plates being designed so as to burst at different pressures.

2. The all-pyrotechnic inflator according to claim 1 wherein said pyrotechnic material has a grain geometry means which provides a substantially constant surface area exposed to burning during said combustion.

3. The all-pyrotechnic inflator according to claim 1 wherein said pyrotechnic material has a grain geometry means which provides quick initial generation of gas, substantially constant generation of gas over a time interval and rapid termination of gas generation after the time interval for generation of gas has ended.

4. The all-pyrotechnic inflator according to claim 1 wherein said pyrotechnic material has a coating on at least one surface thereof which enhances ignition.

5. The all-pyrotechnic inflator according to claim 1 wherein said substantially constant pressure means further comprises a plurality of screen means, one screen means for each aperture in said inner wall, said screen means arranged on an interior side of the burst plate.

6. The all-pyrotechnic inflator according to claim 5 wherein said outlet means comprises a plurality of outlet ports along at least part of the longitudinal extent of said outer wall.

7. The all-pyrotechnic inflator according to claim 6 and further comprising a thrust neutralizing means on an inner side of said outer wall opposite from said outlet ports on said outer wall for neutralizing thrust resulting from generation of gas.

8. The all-pyrotechnic inflator according to claim 6 and further comprising a filter means arranged in said annular space.

9. The all-pyrotechnic inflator according to claim 8 wherein said outlet ports of said outer wall are apertures arranged in at least two rows on said outer wall.

10. The all-pyrotechnic inflator according to claim 9 wherein said apertures in one row are larger than said apertures in said other row.

* * * * *